United States Patent [19]
Baffas

[11] 3,907,049
[45] Sept. 23, 1975

[54] LINED PIPE AND METHOD OF MAKING SAME

[76] Inventor: George J. Baffas, 44 Evangelistrias Str, Glyfada, Athens, Greece

[22] Filed: Jan. 25, 1974

[21] Appl. No.: 436,816

[30] Foreign Application Priority Data
May 15, 1973 Greece .......................... 1960/16/88
Sept. 12, 1973 Greece ............................ 2749/21/3

[52] U.S. Cl. .............................. 138/155; 29/473.3
[51] Int. Cl.² .......................................... F16L 9/22
[58] Field of Search ......................... 138/140–148, 138/155, 101; 220/63; 29/455, 473.3, 473.5, 157 T, 474.3, 474.4

[56] References Cited
UNITED STATES PATENTS

| | | | |
|---|---|---|---|
| 2,209,290 | 7/1940 | Watts | 220/63 |
| 2,991,806 | 7/1961 | Rocheville et al. | 138/101 |
| 3,335,758 | 8/1967 | Bertolet, Jr. | 138/140 |
| 3,474,834 | 10/1969 | Carey | 138/140 |
| 3,598,156 | 8/1971 | Ulmer et al. | 138/143 |

FOREIGN PATENTS OR APPLICATIONS

| | | | |
|---|---|---|---|
| 1,532,024 | 5/1968 | France | 138/143 |

Primary Examiner—Leonard D. Christian
Attorney, Agent, or Firm—Pollock, Philpitt & Vande Sande

[57] ABSTRACT

A pipe or conduit system for the transporting of fluids comprising a protected metal pipe provided with both internal and external pipe lining members, the protected pipe being formed of steel or the like to provide strength, the interior protective pipe being effective to protect the metal pipe against corrosion resulting from the nature of the material being transported, while the exterior protective pipe provides protection to the protected pipe from external sources of corrosion. Both protective pipes may be formed of plastic and are so sized as to fit, respectively, within or around the protected pipe with a small clearance therebetween in the order of a few millimeters. At each end of a respective assembly of the protected and protecting pipes, the internal and external lining pipes are radially spaced from the protected pipes by means of a hardening dense material such as mixture of two epoxy resins which is injected into the space between the pipes through apertures provided for this particular purpose. In one form of the invention, a flange is secured to each end of the protected pipe, and the invention is also concerned with the method whereby an assemblage of such pipes is formed either in the factory or in the field.

18 Claims, 5 Drawing Figures

US Patent  Sept. 23, 1975  3,907,049
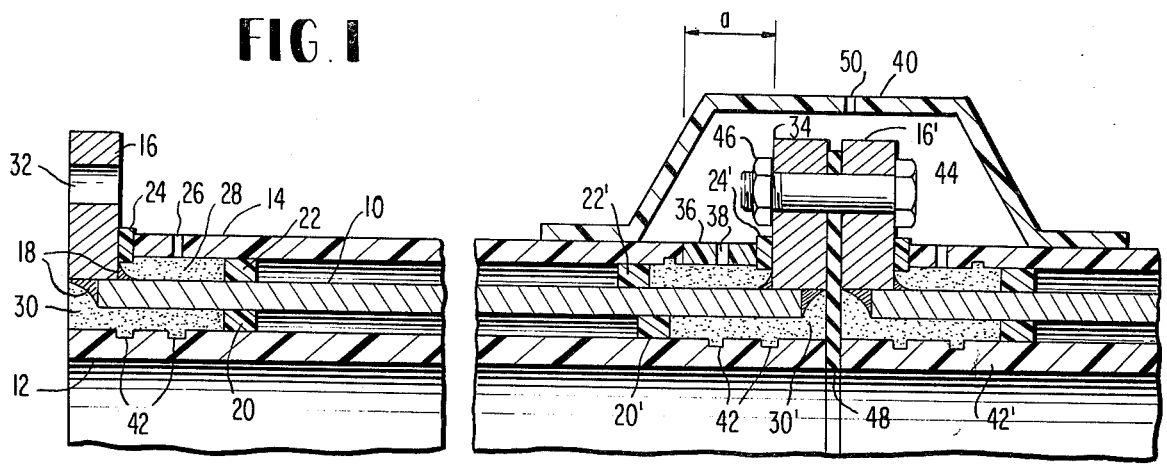
FIG. 1
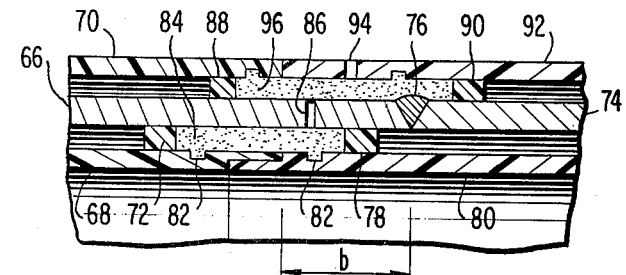
FIG. 1A
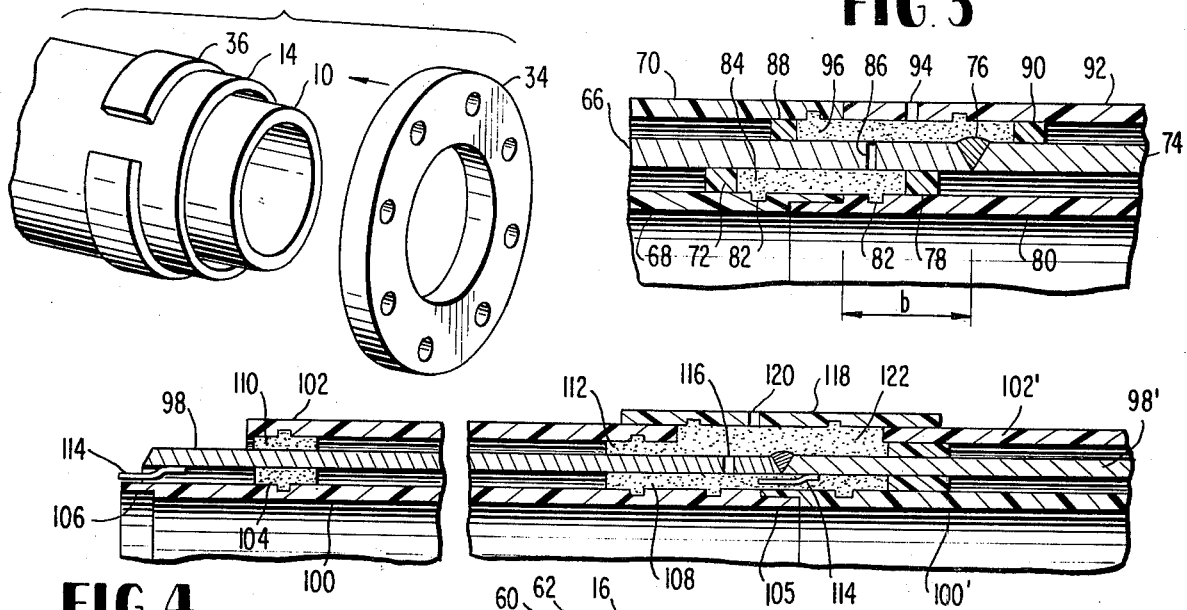
FIG. 3
FIG. 4
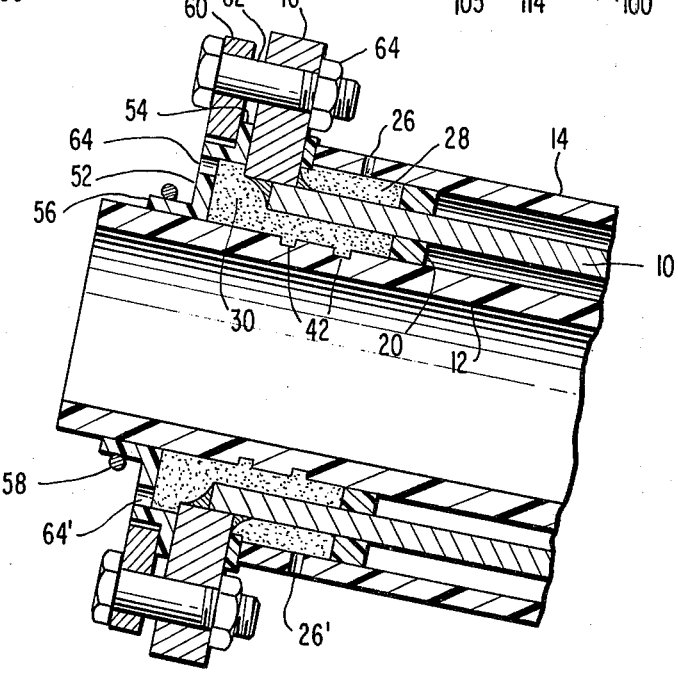
FIG. 5

LINED PIPE AND METHOD OF MAKING SAME

BACKGROUND OF THE INVENTION

In the transporting of fluids via a pipeline, a problem often arises in that the steel pipe which is normally used for such purpose is subject to considerable amounts of corrosion, either externally as a result of the environment in which the pipe is placed and/or internally as a result of the corrosive characteristics of the fluid being transported. Such corrosive effects are particularly troublesome where the pipeline is placed under water or in damp soil, and of course the interior surfaces of the steel pipe may be subjected to considerable corrosion effects when certain types of fluids are transported therein.

It is of course known in the prior art to provide a plastic liner element for a metallic pipe. U.S. Pat. No. 2,982,311 to Haskell discloses a pipe system comprising an outer metallic conduit with an inner plastic liner. The Hacker U.S. Pat. No. 3,737,493 discloses a method and apparatus for filling the annular cylindrical spaces between the inner and outer walls of the pipe or conduit with a cementitious grout. The West German Pat. No. 2,113,165 is also of interest since it discloses the use of an exterior protective pipe which is spaced from the interior protected pipe by a sealing material.

SUMMARY OF THE INVENTION

The present invention provides, according to a preferred embodiment, a metallic pipe, preferably formed of steel, and hereinafter characterized as the "metal pipe", and with such pipe being protected both externally and internally by plastic liner pipes which, for purposes of convenience, will hereinafter be designated as the "outer pipe," and "inner pipe," respectively. Both the outer and inner pipes are so sized that they can be quite readily fitted, respectively, over and within the metal pipe with a clearance therebetween of a few millimeters. In the assembly of the combination, an annular sealing member is inserted into the space between the metal pipe and the inner pipe some distance inwardly from their ends so as to define an annular space inwardly from their ends into which a cementitious material may be injected which, upon hardening, secures the inner pipe to the metal pipe at each end. Similarly, an annular sealing member is placed between the metal pipe and the outer pipe at each end and inwardly of their ends so that here too an annular space is defined into which a cementitious material can be injected which, upon hardening, separates these two pipes and also connects the one to the other. Injection of the cementing material which may, for example, be a mixture of two epoxy resins, is by way of one of two radially extending apertures in the outer pipe, with the cementing material being injected into one of these apertures while air is permitted to escape from the other one, thereby permitting the annular space to be entirely filled with the cementitious material.

According to a preferred embodiment of the invention, successive sections of the pipe assembly are joined by flanges which are welded, respectively, onto the mating ends of the metal pipe. An annular member may be provided at each joint which completely encircles the flanges, and it is also possible for the space defined by the pipe assembly together with its flanges and inwardly of the encircling casing member to be filled with a cementitious material for additional protection.

An alternative embodiment of the invention comprises an assemblage of metal and inner and outer protective pipes which are so arranged that their complete assembly can readily be carried out entirely in the field. According to a still further embodiment of the invention, the assemblage of pipes is so arranged as to permit their prefabrication in a factory, with later, final assembly of successive units taking place in the field.

In addition to providing excellent protection against corrosion of the protected pipe, the invention further provides the advantage of increasing substantially the thermal insulation of the fluid contents of the pipe. Thus, it has been found that heated fluids transported in a pipeline constructed according to the invention experience far less heat loss than would ordinarily occur in an unlined steel pipe.

A further advantage of the invention resides in the ability to convert conventional, existing pipelines to use the novel concepts of the invention. Thus, it is readily possible to install internal or external protective pipes in an existing steel pipeline as will be described.

BRIEF DESCRIPTION OF THE DRAWINGS

In describing the invention, reference will be made to the accompanying drawings in which:

FIG. 1 is a partial cross-sectional view of a length of pipeline constructed in accordance with the present invention and employing flanged joints at each successive junction;

FIG. 1A is an exploded perspective view illustrating the method of assembly of a flange to one end of an assembly of a protected metal pipe and an outer protective pipe;

FIG. 2 is a cross-sectional view illustrating a portion of the pipe assembly of FIG. 1 and showing particularly the means which is employed in the step of injection of a cementitious material between the metal pipe and the internal protecting pipe;

FIG. 3 is a partial cross-sectional view of an alternative embodiment of the invention which is particularly adapted for assembly in the field; and FIG. 4 is a partial cross-sectional view of a further alternative embodiment of the invention which is particularly adapted for assembly within a factory of successive sections of lined pipe for later final assembly into a continuous pipeline in the field.

DETAILED DESCRIPTION OF THE PREFERRED EMBODIMENTS

In FIG. 1, the metal pipe is shown at 10, the internal protective pipe which may be formed of polyvinyl chloride for example is shown at 12, and the external protective pipe which also may be formed of PVC is shown at 14. A metal flange 16 is welded to the end of metal pipe 10 and with the welds shown at 18. Instead of flange 16 of FIG. 1, any other type of flange (welded or not) can be used as well as any other type of coupling which would be suitable in carrying out the method of this invention. An annular ring of sealing material 20 is placed between metal pipe 10 and plastic pipe 12 some distance inwardly from their respective ends, and a similar annular ring of a larger diameter is provided at 22 between metal pipe 10 and external protective plastic pipe 14. A further annular ring 24 of resilient material is provided between the end of external plastic pipe 14 and the inner face of flange 16. A radially extending bore hole 26 is provided through the wall of outer pipe 14 to permit the injection therethrough of a cementitious material which, upon hardening, forms an annular sleeve 28 between metal pipe 10 and outer pipe 14. As will later be described, a cementitious material is also injected into the annular space between metal pipe 10 and inner pipe 12 to form the annular sleeve 30. A plurality of circumferentially spaced holes are provided at 32 in flange 16 for the purpose of permitting the flanges on successive sections of the pipe assembly to be joined.

To assemble the combination of main steel pipe with inner and outer protective plastic pipes in the manner shown in FIG. 1, the following method steps are employed:

First of all, the desired lengths of metal pipe 10 which are preferably formed of a seamless steel tubing are welded end-to-end to provide the desired length for a single section of protected pipe. In a typical installation, the length of steel pipe between successive flanges may be about 12 meters. Next, the flange 16 is welded onto the one end of pipe 10, and it will be assumed in FIG. 1 that such flange is welded onto the left end of pipe 10. Next, the exterior and internal surfaces of pipe 10 at its left end which are to be in contact with the cementitious material shown at the left-hand end of FIG. 1 are cleaned as by means of a wire brush, for example, so as to ensure good adhesion of the cementitious material to the steel pipe surfaces. Next, the ring of sealing material 22 is fitted about the outer surface of pipe 10 at a predetermined location from the left end of pipe 10, and also the annular resilient ring 24 is secured to the face of flange 16.

The next step is to place the external protective plastic pipe 14 over the right-hand end of steel pipe 10 and slide it therealong until the left-hand annular edge of pipe 14 tightly abuts the resilient ring 24. Two diametrically opposed holes 26, 26' (See FIG. 2) are now drilled through the plastic pipe 14. Preferably the assemblage of steel pipe 10 and external plastic pipe 14 is now oriented so that one of the through holes 26, 26' is at the bottom while the other is at the top and, at this time, the cementitious material is injected into the bottom of these holes while the air entrapped therein escapes through the upper of such holes until the cementitious material begins to overflow the topmost hole thereby ensuring that the annular space defined by the external wall of pipe 10, sealing ring 22, internal wall of pipe 14, resilient ring 24 and inner face of flange 16 is fully filled with the cementitious material. The two holes 26, 26' are then temporarily plugged and the cementitious material is allowed to harden and solidify.

The immediately following method steps are concerned with the securing of the right-hand flange 34 to steel pipe 10 and the cementing of outer pipe 14 to steel pipe 10 at their right-hand ends. More specifically, it will be noted that outer pipe 14 is initially cut so that its length is somewhat shorter than that of metal pipe 10. Thus, when pipe 14 is in the position shown with its left-hand annular edge abutting the resilient member 24, the right-hand annular edge of pipe 14 is still at a significant distance (shown as the distance "$a$" in FIG. 1) from the left-hand face of flange 34. The purpose of this is to ensure that the exterior plastic pipe 14 will not be damaged from the sparks and heat which is imparted to metal pipe 10 at the time it is welded to flange 34.

Prior to a welding of flange 34 onto metal pipe 10, a piece of plastic pipe 36 whose axial length is slightly less than the distance $a$ in FIG. 1 and whose diameter equals that of outer pipe 14 is cut, and this plastic pipe is also cut through its sidewall parallel to its longitudinal axis as shown in FIG. 1A, thereby forming, in effect, a split ring. The split ring is then placed over the outer surface of outer pipe 14 which it can now readily do because of the cut in its sidewall which permits it to be effectively expanded in diameter, and then the sealing ring 22' is inserted into the annular space between metal pipe 10 and outer pipe 14 to a predetermined distance inwardly of their respective right-hand ends so as to define an annular space which can subsequently be filled with the cementitious material. At this time, the flange 34 is welded to the right-hand end of pipe 10, and, following this, the annular ring of sealing material 24' is secured to the face of flange 34. Next, the split ring 36 is moved to the right so that it abuts the sealing ring 24' and the abutting edge surfaces of pipe 14 and ring 36 are sealed as by the use of a plastic adhesive tape. Diametrically opposed holes are then drilled at 38 into ring 36 (only one such hole being shown in FIG. 1) so that the cementitious material may be injected into the bottom one of these holes, with air escaping the uppermost of the holes, until the annular space defined by the outer surface of pipe 10, sealing ring 22', internal surface of outer pipe 14, internal surface of ring 36, resilient ring 24' and face of flange 34 is entirely filled with the cementitious material. This cementitious material is now allowed to solidify, thereby completing the external protection of steel pipe 10 except for the external casing members 40 which may, if desired, be provided as will be later described.

To provide internal protection for pipe 10, the internal plastic pipe 12 is cut to the desired length and is then preferably provided with at least one annular groove 42 adjacent each end thereof. In cutting the pipe 12, its length is preferably chosen to be slightly in excess of the length of pipe 10 so that when pipe 12 is finally cemented into place, its respective ends will protrude slightly beyond the outer surfaces of the respective flanges 16 and 34. This makes it possible for both the internal pipe 12 and the cemented portion 30 or 30' to be ground down perfectly flush with the external faces of flanges 16 and 34, thereby permitting a perfect sealing connection between adjacent flanges. After the pipe 12 has been inserted within steel pipe 10, the respective sealing rings 20, 20' are inserted and thereafter the cementitious material is inserted to provide the annular sleeves 30 and 30'. By reason of the annular grooves 42, the plastic pipe 12 is axially secured to the steel pipe 10, thereby prohibiting axial movement of these two pipes relative to each other even in the event that the adhesive properties of the cementitious material are subsequently destroyed.

Where desired, each flanged junction can be provided with further protection by means of a surrounding casing member 40 as illustrated in FIG. 1. The member 40 can be formed of plastic or other corrosion resisting material and provided with a first cylindrical portion of sufficient internal diameter to provide internal clearance with the juxtaposed flanges 34 and 16' which are now joined by suitable through bolts 44 and cooperating nuts 46 and with an appropriate gasket member 48 interposed between the facing surfaces of the two flanges.* The member 40 is also provided with end portions of smaller diameter which will however readily fit over the outer surfaces of plastic pipes 14. Preferably the member 40 is formed of two parts which are preferably symmetrical so that they can be placed in position at the location of the joint after the flanges have been bolted together. Once these two component parts of the flange 40 are placed in position, they may be secured together in any conventional fashion. Diametrically opposed through apertures 50 are provided so that cementitious material may now be injected into a bottom one of these holes to fill the entire space within the casing 40 while air is ejected from the upper one of such apertures. *

Gasket 48 pressed between the two annular edges of pipes 12 and 12' prohibits leakage even in case adhesive properties of cementitious material are subsequently destroyed.

When the installation is provided with the casing 40 at the location of the joined flanges, and where the cementitious material is injected into the casing 40, it is then usually not necessary to provide the split ring 36 since the cementitious material which is injected into the casing 40 provides the desired sealing of the metal pipe 10 at the region of its junction to the flange 34. It is also possible to avoid the necessity of providing the split ring 36 in those instances where the casing 40 is so constructed as to provide a hermetic seal about the junction of the flanges, but in this situation it becomes desirable that suitable gasket materials be provided for the two parts forming the casing 40 to ensure that a tight hermetic seal will indeed exist to guard the joint against corrosion.

FIG. 2 illustrates the preferred method and apparatus for placing the cementitious material 30 between the metal pipe 10 and the inner pipe 12 of FIG. 1. As previously described, the sealing ring 20 is placed in position between steel pipe 10 and inner plastic pipe 12 and thereby defines an endwall of the cement sleeve which is to be formed between these two pipes. In order to define the opposing end surface of this cementitious sleeve 30, an annular sleeve 52 is provided having one annular portion 54 which abuts the outer face of flange 16 and a further cylindrical portion 56 which fits slideably about the outer surface of plastic inner pipe 12. The member 52 may be formed of a plastic material, rubber, leather, etc., which is to some degree at least deformable so that it can be held in place with its cylindrical portion 56 about the outer surface of plastic tube 12 by means of an encircling steel ring 58. The member 52 is further held in place around its outer peripheral edge by means of metallic ring 60 which is provided with a plurality of circular apertures enabling the ring 60 to be secured to flange 16 by threaded bolts 62 and nuts 64. Two apertures 64, 64' diametrically opposed are provided in the member 52 to permit the injection of a cementitious material in the space thus defined by the outer surface of inner pipe 12, sealing member 20, inner surface of metal pipe 10 and annular member 52. Before injection of the cementitious material, the pipe assembly is preferably oriented so that one of the apertures 64' or 64' is at the bottom and the other at the top and also the entire assemblage of pipes is slanted in the manner shown in FIG. 2 so as to facilitate the movement of the air trapped within the above defined space to get out during injection. As the material is injected into the lower aperture, air is driven out of the upper aperture, and when the cementitious material finally begins to emerge from the upper aperture, one can be assured that the entire space is filled with the cementitious material which is then of course allowed to harden and solidify so as to seal the inner plastic pipe 12 in place. The member 52, it will be noted, is so dimensioned that the cementitious material 30 will extend a slight distance outwardly of the outer face of flange 16. This makes it possible for a subsequent grinding operation to grind down the edge of plastic pipe 12 and also the outer edge of the cementitious material 30 to make it flush with the outer face of flange 16 as previously mentioned.

An alternative embodiment of the invention is illustrated in FIG. 3 and this embodiment is constructed in such a manner as to facilitate the complete assembly of the various elements in the field. The various elements of FIG. 3 are assembled in the following manner: First of all, it is assumed that the metal pipe 66 is secured at its left-hand end such as to a flange or the like in the manner previously described in connection with FIG. 1. The inner plastic pipe 68 is then inserted within the metal pipe 66, but it will be noted that its right-hand end is sufficiently short to ensure that it terminates a predetermined distance $b$ inwardly of the free end of metal pipe 66. Thereafter, the outer plastic pipe 70 is slid over the free end of metal pipe 66 and also secured at its left-hand end to the metal pipe 66 in a suitable manner. This outer pipe 70 similarly is of a length such that it terminates inwardly of the free end of metal pipe 66. At this point, the annular sealing ring 72 is inserted in place between metal pipe 66 and internal plastic pipe 68.

The next successive length of metal pipe 74 is now welded to the first-mentioned pipe length 66, such weld being shown at 76.

An annular sealing ring 78 is now fitted on the exterior surface of inner pipe 80, and such adjacent length of inner pipe 80 is now inserted into the metal pipe 74 from its right-hand end and inserted sufficiently far to finally bring the left-hand end of inner pipe 80 into an abutting relationship with the right-hand end of inner pipe 68. Preferably, these inner protective plastic pipes 68 and 80 are provided with either mating threads or with conically shaped mating surfaces as shown in FIG. 3 permitting them to be frictionally joined when one is inserted into the other. In the latter situation, prior to insertion of the inner pipe 80 into the metal pipe 74, a suitable adhesive material is brushed onto the end of the pipe 80 so that when it is mated with the opposing end of pipe 68 the two plastic pipes can be firmly joined.

Preferably both pipe 68 and pipe 80 have annular grooves 82, formed therein on their outer surfaces in order to provide a locking of these pipes together by the cementitious material which is injected as will now be described. To inject the cement to form the annular seal as shown at 84, two diametrically opposed radial holes 86 are drilled into metal pipe 66, permitting the injection of the cementitious material into the bottom one of these holes while the air is simultaneously expelled from the top hole until the entire annular space is filled with such material as shown at 84. After filling with the cementitious material, both apertures are plugged and the material is allowed to harden. If desired, these apertures 86 may thereafter be sealed or may be welded closed even though some of the cementitious material immediately adjacent the inner end of the aperture may be destroyed in the welding process.

The next step is to put into place the annular seals 88 and 90. Following this, an additional length of outer plastic pipe 92 may be slid over the metal pipe 74 until its left-hand end abuts the right-hand end of pipe 70. If desired, the opposing ends of the exterior plastic pipes 70 and 92 may be either threaded or formed with conically shaped mating surfaces. In any event, the joint between members 70 and 92 is then sealed, using for example an insulating adhesive tape, and two through apertures which are diametrically opposed, and of which only the upper one 94 is shown in FIG. 3, are drilled into the outer pipe 92, with the cementitious material then being injected into the bottom one of these holes until the material starts to emerge from the upper hole.

In those instances where the adjoining lengths of inner pipe and the outer pipe are provided with threaded connections, and where the liquid which is transported is under low pressure, it may be possible to omit entirely the cementitious material shown at 84 and 96.

FIG. 4 illustrates a further embodiment of the invention wherein the steel pipe which is to be protected is assembled with the inner and outer plastic protective pipes in a factory and with the arrangement of the several parts being such that easy assembly of successive sections in the field is facilitated. In FIG. 4, the metal pipe is shown at 98, and it may be provided with tapered edges as shown. Into a predetermined length of such steel pipe 98 there is inserted the inner protective plastic pipe 100 which is preferably chosen to have a length which is somewhat in excess of that of the metal pipe 98. Thus, in the situation shown in FIG. 4, the adjoining ends of inner pipes 100 and 100' are provided with conically tapered mating ends 105 and 106 and accordingly the amount of overhang at each end of the inner pipe relative to the metal pipe 98 equals about one-half of the length of the joint of the pipes 100, 100'. The outer plastic pipe 102 is shown as being cut to length somewhat less than that of the metal pipe 98.

Metal pipe 98 and inner pipe 100 are cemented to each other in the manner already discussed herein and as shown at 104 and 108 in FIG. 4. Both of these locations for the placement of the cementitious material, i.e., at 104 and 108, are located inwardly from the outer ends of the metal pipe 98 to ensure that the cementitious material will not be damaged by the subsequent welding of metal pipe 98 to a successive length 98' of such pipe. Outer pipe 102 is cemented to metal pipe 98 in a similar manner with the cementitious material for effecting the junction being shown at 110 and 112. It will be noted that each of these annular bands of cementitious material 110, 112 is preferred to be so positioned as to lie slightly inwardly of the respective end of outer pipe 102.

To join two successive assemblies of factory preformed pipe according to the embodiment of FIG. 4, the ends of the pipe 100 which are to be joined are coated with a suitable adhesive or cement and with these mating plastic parts brought into contact, i.e., with the left-hand end of inner pipe 100' fitting over and mating with the right-hand end of inner pipe 100. When these two elements are brought into juxtaposition, the adjoining ends of metal pipes 98 ad 98' are concurrently brought into contact with each other. Secured to the inner surface of meetal pipe 98' (or to pipe 98) is an annular member 114 which may be formed of a suitable material to act as a shield to protect the junction of inner pipes 100, 100' at the time that the metal pipes 98, 98' are welded together. It is possible to eliminate the annular member 114 and merely to allow the junction of the plastic pipes 100, 100' to be fused together by the welding heat, but if this is done it is preferable to insert from the remote open end of either pipe 100 or pipe 100' a piston-like element at the end of a long rod or stick which will have the effect of maintaining the internal diameter of the internal plastic pipe during the partial melting that results from the welding operation.

If it is now desired to fill the annular space between metal pipes 98, 98' and internal plastic pipes 100, 100' with a cementitious material, this can as before be accomplished by drilling two diametrically opposed apertures 116 in one or both of the two steel pipes near their junction so that the cementitious material can be injected into the lower one of these apertures 116 while air is simultaneously expelled out of the upper one of the apertures.

The external coupling member 118 can now be put into place and, once again, a cementitious material may be injected into diametrically opposed radial apertures 120 to provide the cementitious annular seal as shown at 122.

In addition to providing excellent protection against internal and external corrosion, it has been found that various other advantages are provided. Thus, it has been found that pipelines constructed according to the present invention are readily able to cope with the expansion and contraction of thee various materials which are employed. For example, in one installation, the steel pipe comprised seamless pipe with an external diameter of 178 millimeters, and an interior diameter of 168 millimeters, while the internal plastic pipe was made of polyvinyl chloride having an external diameter of 160 millimeters and an internal diameter of 150.6 millimeters. The cementing of the internal pipe to the steel pipe took place only along 12 centimeters at each of the respective ends. Such an assembly of pipes was then filled with water with a temperature of 95°C and a pressure of 30 KG/CM$^2$. Even under these conditions, the pipe assembly was found upon inspection to have suffered no damage and with the plastic internal pipe intact. Since the steel pipe is effective to maintain the internal plastic pipe straight, it is believed that all of the stresses which are caused by the expansion resulting from high temperature within the mass of the plastic pipe are purely compressive and uniformly distributed over its cross-section. Moreover, the fixed ends of the plastic pipe which are secured to the steel pipe by means of the cement experience shearing stresses along the cylinder of contact which are also uniformly distributed. These stresses are diminished if the faces of the plastic pipe bear against flanges or adjacent plastic pipes at the ends of each section. The reduction of shearing stresses is then due to generated compressive stresses.

Under conditions of high temperature and pressure, the small radial expansion of the PVC internal pipe occurs until its walls touch the interior walls of the steel pipe and the stresses resulting from hydraulic pressure are then balanced by the steel pipe. This expansion may be done on purpose before setting the pipeline in operation, either in the factory or at the building site of the pipeline, and along the whole length of the internal protective pipe except for the cemented areas. Consequently, the principal stresses acting on the plastic pipe are compressive ones.

A further advantage of the present invention is the ability to quickly and inexpensively repair a pipe which has been subjected to corrosion. Thus, assuming that a hole does eventually appear in a steel pipe, it is possible to overcome this difficulty quickly and quite inexpensively by inserting therein a plastic internal pipe in the manner disclosed herein. The insertion of such a plastic pipe within the original metallic pipe involves only a fraction of the expense of completely replacing the original pipeline. It has, moreover, been found that the small reduction of the effective diameter of the steel pipe by reason of the insertion of the protective plastic pipe does not usually produce any significant hydraulic problem. Thus, by using preferably a relatively flexible plastic pipe, it is possible to insert a considerable length of such pipe in a steel pipe without using an excessive number of junctions. In the modification of an existing metallic pipeline, the network of pipes can be disassembled and lengths of the protective plastic pipe inserted, with the length of pipe inserted at any location being dependent upon the presence of bends or angles which may at times produce such frictional resistance to the insertion of pipe as to make the insertion of a long length of plastic pipe impossible; in such an instance, the pipe is cut at any such location and flanges added to facilitate the forming of a joint at the location of any such flange as illustrated, for example, in FIG. 1.

In a practical application of the apparatus and method of this invention, an underwater pipeline was laid with steel pipe and internal plastic pipe having the dimensions stated above and with the external protective pipe also being formed of polyvinyl chloride and having an internal diameter of 189.2 millimeters and an external diameter of 200 millimeters. When such a pipeline was used to transport fuel oil, it was found that one thousand tons of fuel oil passed through such pipe with a temperature of 48°C and over a length of 160 meters, and arrived at the tank with a temperature of 47°C, i.e. a temperature drop of only 1 °C. This compares with a drop of approximately 16°C for the transporting of oil in a pipeline of conventional construction and using only a steel pipe but with other conditions being the same. Thus, it is apparent that the present invention provides a further attractive feature of providing considerable thermal insulation.

Another advantage of the invention is the increased rate of flow of a fluid transported through a pipeline protected internally by plastic pipes, due to smaller coefficient of friction of plastic, compared to coefficient of friction of steel and its oxides. An increased rate of flow of about 15 percent was noticed in the first application (mentioned above) of the invention in transporting gasoline and diesel oil, and of about 25 percent in fuel oil; more in fuel oil because of the negligible temperature drop (mentioned above too) contributing to the small coefficient of friction of plastic.

An interesting application of the invention can be done in industrial hoses having metal flanged nipples at ends (e.g. hoses for ships' refueling). By using a flexible plastic pipe secured within the nipples only, according to FIG. 1, a perfect internal protection can be achieved.

A curved pipe can be protected either by using flexible protective pipes, or by using inflexible curved protective pipes having the same mean (corresponding to their axis) radii of curvature with curved pipe to be protected. Of course in this last case curved pipe to be protected must have only one mean radius of curvature i.e. its axis must belong to an arc of circumference. Cementing of protective curved pipes on the protected one can be done according to FIG. I, or 3, or 4.

A "Y" (or "T") junction of pipes can be protected by shaping its protective pipes-branches (forming the two protective Y junctions, one for internal and the other for external protection) so, that when assembled in position, (one within and the other around Y to be protected) to form two Y junctions similar to the protected. Then by means of a resilient material (adhesive preferred) set, before assembling, on the lines of contact of the protective pipes-branches (to each other), that form the two protective Y junctions, in a manner similar to setting of sealing material 24 on pipe 14 of FIG. I, a leakproof contact among them is achieved, and thus cementitious material can be injected (along desired lengths) between protected and protective branches according to methods already described. Connections of so protected Y junctions to the rest pipeline network may be done according to ways shown in FIGS. I, 3, or 4. If Y junction to be protected must have flanged branches, external protective Y must be formed and assembled before flanges' welding, having in mind FIG. 1A for avoiding burning tips of protective pipes during welding.

For better securing of protective pipes on the metal pipe, (if needed) shown in FIGS. 3 and 4, grooves similar to 82 may be provided on the metal pipe internally and externally, within the areas of contact with the cementitious material. Instead of grooves some projections may be provided on the metal pipe (e.g. by using a welder's electrode) at the same mentioned areas, giving the same advantage with grooves, which is prohibiting axial movement of these pipes relative to each other even in the event that adhesive properties of cementitious material are sudsequently destroyed.

External coupling member 118 of FIG. 4 may also be a piece of pipe having same diameters with protective pipe 102 and length slightly less than the length of the annular gap between the opposed outer pipes 102 and 102', cut through its sidewall parallel to its longitudinal axis, forming a split ring that will be used in a way similar to ring 36 of FIG. 1A.

What I claim is:
1. Fluid transporting means comprising in combination:
   a metal pipe;
   an inner pipe of plastic which fits within said metal pipe so as to provide a predetermined clearance space between the opposed surfaces of said metal and said inner pipes,
   a plurality of annular rings of cementitious material at spaced locations between said metal pipe and said inner plastic pipe,
   an outer pipe of plastic which fits over said metal pipe so as to provide a predetermined clearance between the opposed surfaces of said metal and said outer pipes,
   and a further plurality of annular rings of cementitious material at spaced locations between said metal pipe and said outer plastic pipe.
2. The fluid transporting means of claim 1 which further includes joint means for each junction of successive lengths of said metal pipe, each said joint means providing a fluid-tight seal between successive lengths of said inner pipe and also of said outer pipe to thereby protect both the internal and external surfaces of said metal pipe.

3. A fluid transporting means comprising in combination:
a metal pipe,
a plastic pipe which fits within said metal pipe,
an annular sealing member fitting between said inner pipe and said metal pipe at a location removed from their ends which are substantially coplanar,
said inner pipe having at least one annular groove on its external surface adjacent its end,
and a cementitious material filling the space defined by the outer surface of the inner pipe, the inner surface of the metal pipe, and said sealing member,
said cementitious material also filling said at least one annular groove to thereby lock said inner pipe axially relative to said metal pipe.

4. The combination of claim 3 which further includes an external plastic pipe fitting over said metal pipe, a second annular sealing means disposed between said external pipe and said metal pipe and axially located inwardly of the end of said outer pipe, and a cementitious material filling the space defined by said metal pipe, said outer pipe, and said second sealing means.

5. The combination of claim 3 which further includes an annular flange secured to an end of said metal pipe, an annular resilient member secured to a face of said flange, said outer pipe abutting against said resilient member.

6. The combination of claim 3 wherein adjoining ends of said inner pipe are matably threaded.

7. The combination of claim 3 wherein adjoining ends of said inner pipes are provided with functionally interengaging male and female configurations.

8. The combination of claim 5 which further includes an annular housing surrounding a pair of said flanges secured together, said housing having opposing end portions which closely fit said outer pipe and a central portion of greater diameter which provides internal clearance for said flanges.

9. The combination of claim 8 which further includes a cementitious material filling said housing and surrounding said flanges and the joined outer pipes.

10. A method of manufacturing a section of a pipeline having a metal pipe, an outer plastic protective pipe, and a flange at each end for coupling to the corresponding flange of a successive section, comprising the steps of:
welding a flange onto one end of said metal pipe,
placing a first annular sealing member between said metal pipe and said outer pipe inwardly of the end of said outer pipe,
sealing the junction between said outer pipe and said flange,
forming two apertures which are substantially diametrically opposed in said outer pipe between the end of said outer pipe and said sealing means,
injecting a cementitious material into one of said apertures,
inserting a second annular sealing member between said metal pipe and said outer pipe inwardly of the other end of said outer pipe, said outer pipe having its said other end spaced a predetermined distance from the other end of said metal pipe,
placing a segmented sleeve having an axial length substantially equal to said predetermined length over said outer pipe adjacent its said other end,
welding a second flange onto said other end of said metal pipe,
moving said segmented sleeve into an abutting and sealing relationship with said second flange,
and injecting a cementitious material into the space defined by said metal pipe, said flange, said segmented sleeve, and said second sealing member.

11. The method of claim 10 which further includes the steps of:
inserting an inner plastic pipe into said metal pipe,
inserting a third annular sealing member between said steel pipe and said inner plastic pipe at a predetermined distance inwardly of the adjacent ends of said metal pipe and said inner pipe,
and injecting a cementitious material into the open annular space defined by said metal pipe, said inner pipe and said third sealing member.

12. The method of claim 11 which further includes the steps of securing to said flange an annular member which encloses said open annular space, and injecting through an aperture in said last-mentioned annular member a cementitious material.

13. The method of forming a protected pipe with an inner plastic protective pipe for transporting fluids comprising the steps of:
inserting into a first section of a metal pipe a first plastic inner pipe whose external diameter is slightly less than the internal diameter of said metal pipe, said inner pipe having a length such that its end lies inwardly of the end of said metal pipe by a predetermined distance,
welding to said end of said metal pipe an additional length of metal pipe, said predetermined distance being sufficiently great to ensure that damage to said inner pipe does not occur as a result of said welding operation,
inserting into the far end of said additional length of metal pipe a second length of inner pipe for coupling with the end of said first inner pipe, the adjoining ends of said first and second lengths of inner pipe having respective male and female ends for effecting a leak-proof coupling.

14. The method of claim 13 which further includes the steps of:
prior to said welding step inserting a first annular sealing member between said first section of metal pipe and said first section of inner pipe,
and prior to the insertion of said second length of inner pipe into said additional length of metal pipe placing a second annular sealing member around said second length of inner pipe adjacent the end which is to be joined to said first length of inner pipe,
drilling through the wall of said first length of metal pipe a pair of holes which are substancially diametrically opposed, said holes being substantially vertically aligned,
and injecting a cementitious material into the lower of said holes to fill the space defined by metal and inner pipes and by said two sealing members.

15. The method of claim 14 which further includes the steps of:
placing over said first and second lengths of metal pipe respective first and second lengths of outer plastic pipe, each of said lengths of outer pipe having previously had inserted therein inwardly from its respective ends a further annular sealing member, drilling through the wall of said second outer plastic pipe between the two further annular sealing members a pair of apertures which are substancially opposed diametrically, said apertures being substancially vertically aligned, and injecting a cementitious material into one of said apertures to fill the space defined by said outer plastic pipes, said metal pipes and said further annular sealing members.

16. A section of protected pipe for coupling to others of such sections to form a pipeline for transporting liquids comprising:

a first length of metal pipe, an inner plastic pipe having an outer diameter slightly less than the inner diameter of said metal pipe and with its length substantially equalling that of said metal pipe, an outer plastic pipe fitting about said metal pipe, each end thereof terminating inwardly of the end of said metal pipe by a predetermined distance, means for securing both said inner pipe and said outer pipe to said metal pipe at least adjacent the ends of said inner and outer pipes, and a sleeve closely fitting about said outer pipe at the junction of two said sections for bridging the annular gap between the opposed outer pipes of the respective sections.

17. The combination of claim 16 which further includes an annular band of cementitious material between said inner pipe and said metal pipe and a further band of cementitious material between said metal pipe and said sleeve at the junction of two said protected pipe sections.

18. The combination of claim 16 which also includes an annular band secured to an end of said metal pipe along its inner surface, said band underlying the junction of the two adjoining metal pipes when two said protected pipes are joined end-for-end to form a heat shield for the respective inner pipes when welding said metal pipes.

* * * * *